United States Patent [19]
Tilley et al.

[11] Patent Number: 5,405,229
[45] Date of Patent: Apr. 11, 1995

[54] BALE STACKING AND RETRIEVING APPARATUS

[75] Inventors: Martin C. Tilley, 3003 N. 4025 E, Hansen, Id. 83334; Kenyon J. Blommer, Kimberly, Id.

[73] Assignee: Martin C. Tilley, Hansen, Id.

[21] Appl. No.: 689,628

[22] Filed: Apr. 23, 1991

[51] Int. Cl.⁶ ............................................. B65G 57/32
[52] U.S. Cl. .................. 414/111; 414/789.7; 414/501
[58] Field of Search ............. 414/111, 132, 491, 492, 414/493, 501, 509, 679, 789.7, 24.5

[56] References Cited

U.S. PATENT DOCUMENTS

| | | | |
|---|---|---|---|
| 3,487,955 | 1/1970 | Brown | 414/111 X |
| 3,521,762 | 7/1970 | Walters | 414/501 X |
| 3,549,023 | 12/1970 | Backman | 414/789.7 X |
| 3,638,808 | 2/1972 | Grey et al. | 414/501 X |
| 3,662,900 | 5/1972 | Grey et al. | 414/789.7 X |
| 3,788,495 | 1/1974 | Fachini et al. | 414/501 X |
| 3,941,265 | 3/1976 | Nunnally, Jr. | 414/501 X |
| 4,261,676 | 4/1981 | Balling, Sr. | 414/501 X |
| 4,329,101 | 5/1982 | Green et al. | 414/501 X |
| 4,498,829 | 2/1985 | Spikes | 414/24.5 |
| 4,952,111 | 8/1990 | Callahan | 414/789.7 X |

FOREIGN PATENT DOCUMENTS

| | | | |
|---|---|---|---|
| 2083790 | 3/1982 | United Kingdom | 414/111 |
| 2203119 | 10/1988 | United Kingdom | 414/24.5 |

Primary Examiner—Michael S. Huppert
Assistant Examiner—James Keenan
Attorney, Agent, or Firm—Ken J. Pedersen; Barbara S. Pedersen

[57] ABSTRACT

A novel self propelled "big bale" stacker and retriever capable of stacking 4 by 4 by 8 foot, 3 by 4 by 8 foot, or pairs of 2 by 3 by 8 foot bales in 8 by 8 foot stable, tied units is presented. The stacker of the present invention utilizes a novel "jaw"-like arm that clamps onto a bale lying in a field. The arm swings up vertically and deposits the bale on a rotatable horizontal platform. The rotatable platform rotates 180 degrees to make room for a second bale next to the first. After two bales have been loaded onto the rotating platform, the platform tilts up 90 degrees to deposit the bales on the stacker's bed. By rotating the platform 90 degrees before depositing the bales on the bed, the orientation of the bales in successive tiers can be alternated so as to produce stable, "tied", 8 by 8 by 16 foot stacks.

17 Claims, 10 Drawing Sheets

BALE STACKING AND RETRIEVING APPARATUS

FIELD OF THE INVENTION

The present invention relates to the field of hay harvesting machinery, and more particularly to apparatus for loading, hauling, stacking, and retrieving preformed bales of hay.

BACKGROUND OF THE INVENTION

To obtain the maximum production from a field of hay, each crop of hay must be promptly cut, baled and removed from the field. The more quickly hay can be cut and removed, the more quickly a successive crop of hay can be cultivated.

The harvesting of hay involves three main tasks: 1) cutting the hay; 2) baling the hay; and 3) removing and storing the baled hay. Although originally manual tasks, nowadays these tasks have to a great extent been mechanized. Three types of equipment are usually involved. A swather cuts the hay and deposits the cut hay in rows. A baler scoops up the cut hay and compresses the hay into rectangular bales. A stacker picks up individual bales of hay from the field, accumulates a predetermined number, and deposits the accumulated bales off the field at a storage location.

Of these three tasks, the removing and stacking of the hay bales has heretofore been the most cumbersome.

The difficulties involved in removing and stacking hay bales are to a great extent dependent on the size and quantity of individual bales produced by the specific hay baler that is used. Until recently, hay balers have come in three common sizes, producing the following three sizes of bales: (1) 14" by 16" by 3 or 4 feet long; (2) 16" by 18" by 3 or 4 feet long; and (3) 16" by 24" by four feet long. These three sizes collectively fall in the category of "small bales". More recently, balers capable of producing larger bales of hay have been introduced. The bales produced by these new balers are typically 8 feet in length and have cross sections of 2 by 3 feet, 3 by 4 feet, or 4 by 4 feet. The advantage of these new larger bales is that a given amount of hay can be packed in a significantly smaller number of bales: a 4 by 4 by 8 foot bale of hay is 12 times the size of a 16" by 24" by four foot bale. As few as 1/12 as many "big bales" as compared to small conventional bales are needed to bale a given amount of hay. Fewer bales means less time spent gathering, stacking and moving bales. Another advantage of "big bales" is that they minimize the time needed to transfer a given amount of hay from a stack to a semi-truck for transport. They also result in a more stable and efficient load.

One factor limiting the use of "big bale" balers is the lack of effective machines designed to pick up, transport, stack and retrieve the big bales.

The most common method used for moving "big bales" from the field to a storage area (or to a stack) is to use a tractor with a front end loader attachment together with a flatbed truck and/or a flatbed trailer. The tractor uses the front end loader to load the "big bales", one by one, onto the truck or trailer. The truck or trailer is then driven to the storage area, and unloaded by the same or a second tractor. The bales are accumulated into stacks as they are unloaded by the tractor. For this method of stacking "big bales", two or more pieces of equipment (a tractor and a truck or trailer) and at least two operators (one for each piece of equipment) are required.

Although prior art "big bale" stackers have been developed, they have had little impact at displacing the above tractor/trailer method because they are either slow, awkward to use, have small payload capacities, and/or create unstable stacks of bales.

Figure 1:
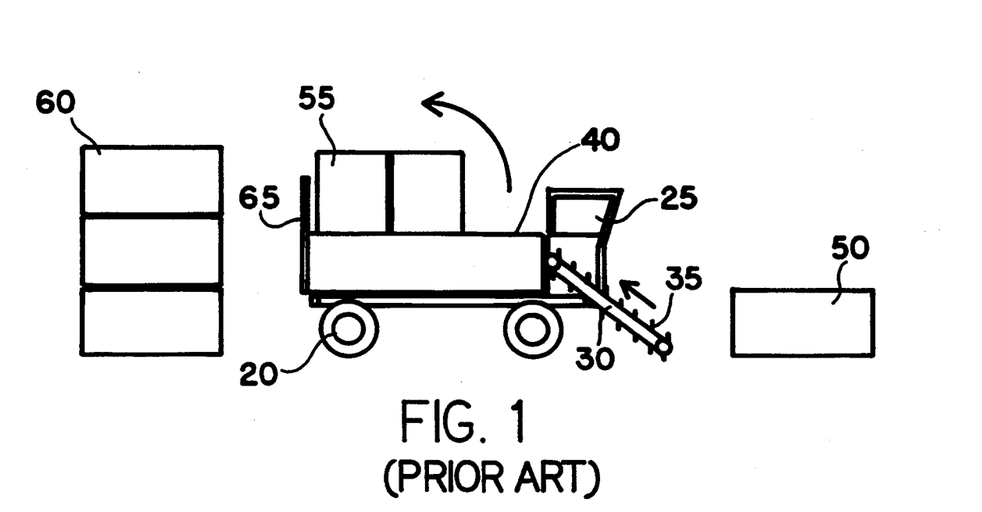
FIG. 1 is a side view of one embodiment of a big bale stacker of the prior art.

One prior art stacker is shown in FIG. 1. It basically consists of a self-propelled truck platform 20 outfitted with a control cabin 25, a conveyor 30, and a tippable bed 40. This type stacker loads bales by driving up to a bale 50 such that teeth 35 of the conveyor's chain belt engage the rear of bale 50 and pull it up the conveyor. When the bale gets to the top of the conveyor 30, it is dumped on end into bed 40. Hydraulic rams or other means mounted to the bed push the bale to the side to make room for the next bale of hay. After the second bale is deposited next to the first, these two bales are pushed back by hydraulic or other means to make room for the second set, or "tier" of bales. The bed of this kind of stacker typically holds six 4 by 4 by 8 foot "big bales" of hay: 3 rows of two bales each stood up on end. Alternatively, this kind of stacker may hold eight 3 by 4 by 8 foot bales arranged in 4 rows of two bales each stood up on end. The stacker shown in FIG. 1 is shown with a partial load 55 consisting of four bales of hay.

Once the bed is filled with a load of six bales of hay, the stacker can be driven to the edge of the field or to wherever it is desired to deposit the hay. To unload the bales, the bed 40 of the stacker tips back as indicated by the arrow in FIG. 1, such that the load of bales is tilted up 90 degrees. Hydraulic "push-off feet" force the stacker out from under the newly formed stack. A resultant three tiered stack 60 is formed.

Figure 2:
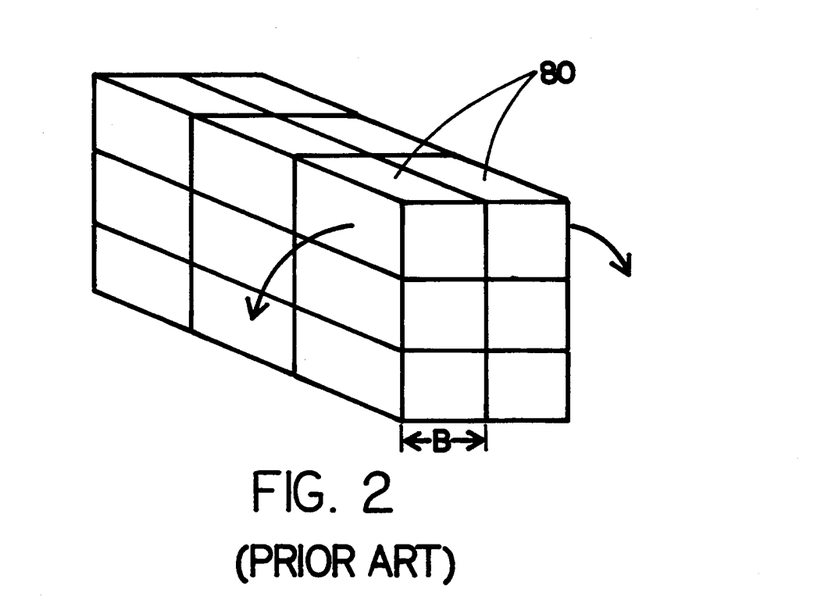
FIG. 2 is a perspective view of the stack produced by the stacker of FIG. 1.

Because of the way this type of stacker deposits stacked bales (i.e. loading and unloading off its back end) and the way in which the bales are retrieved by the conveyor and stored in the bed (i.e. on end), the type of stack formed by successive loads has the configuration shown in FIG. 2: essentially two columns, three bales high, arranged lengthwise side by side. Because there is no supporting means on the outside sides of the bales, and because of the narrow base "B" of the bales, this configuration tends to be unstable. As a result, as the bales dry out and start to shrink, the top bales 80 are often dislodged, as shown by the arrows in FIG. 2.

In a second prior art big bale stacker, instead of conveyor 30, a hydraulic articulated crane boom with a claw-type grabber is used to grab, lift and load bales onto the loading bed. This embodiment has the advantage that it can make "tied" loads (loads in which the orientation of alternating tiers of bales differ by 90 degrees), it can retrieve and stack all three "big bale" sizes, and can retrieve bales one at a time. The boom can also be used to unload bales directly from the stacker onto a truck, or the bed can be tilted to deposit the bales in the same manner as the stacker shown in FIG. 1. Disadvantages of this type of stacker are (1) it is complex and expensive to manufacture; (2) it requires extensive skill to operate; (3) since each bale must be individually grabbed by the boom, it has a slow loading time; and (4), like the previous embodiment, it has a limited load capacity.

Figure 3:
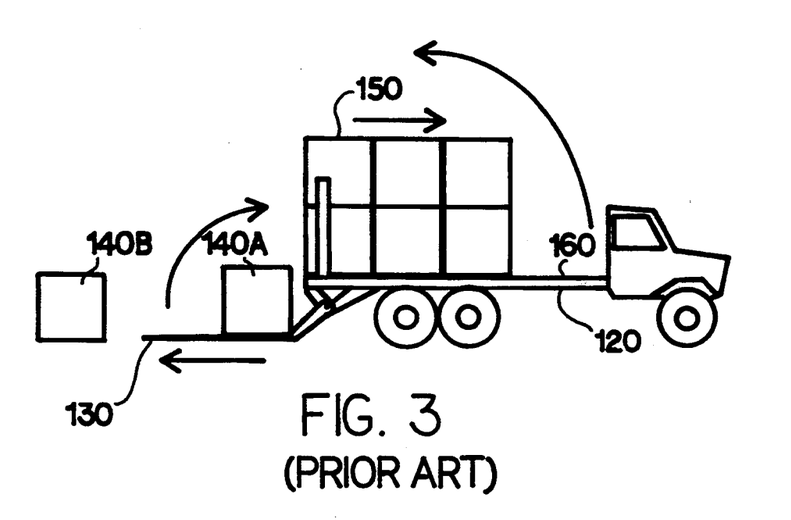
FIG. 3 is a side view of another embodiment of a "big bale" stacker of the prior art.

A third type of prior art "big bale" stacker is shown in FIG. 3. This kind of stacker basically consists of a flatbed truck 120 with two large "forks" 130 pivotably attached to the back of the bed. Forks 130 are initially lowered near the ground. The truck 120 lines up in front of a bale of hay and backs up, pushing the forks under the bale. The forks of the stacker shown in FIG. 3 have a capacity of two bales. After the first bale has been loaded, the forks 130 are lifted slightly off the ground and the stacker drives to the next bale, where the action is repeated. The stacker shown in FIG. 3 is shown with one bale 140A already on its forks as it is about to load a second bale 140B. After the second bale has been loaded onto the forks, the forks are pivoted upwards 90 degrees, depositing the two bales picked up by the forks on the truck's bed 160. Any bales 150 already on bed 160 are pushed back along the bed by the new bales being deposited. When the bed is full (the stacker illustrated has a capacity of eight bales), the stacker is driven to the area where it is desired to deposit the bales and the bales are unloaded using the same general method described in relation to the stacker shown in FIG. 1, with the exception that no "push-off feet" are required.

Figure 4:
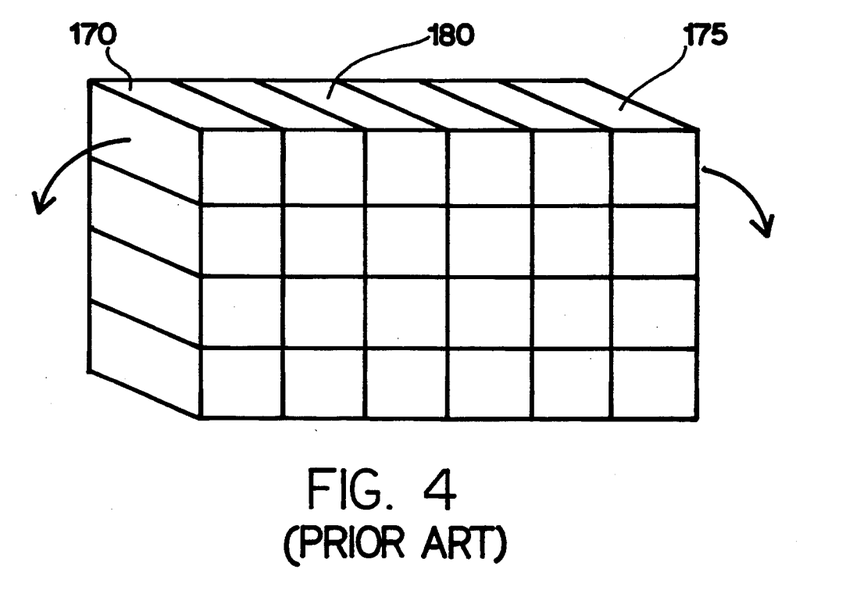
FIG. 4 is a perspective view of the stack produced by the stacker of FIG. 3.

Since the bales in this prior art stacker are loaded onto the stacker's bed on their sides rather than on their ends (as in the stacker of FIG. 1), the configuration of the stack resulting from multiple loads of bales, as shown in FIG. 4, consists of a single four-tiered row of bales sitting crosswise, instead of the two narrow side by side columns shown in FIG. 2. This arrangement is much more stable than the arrangement shown in FIG. 2, although the outermost ends of the stack 180 shown in FIG. 4 still tend to be unstable. Another disadvantage of this kind of stacker is that a bale-turning apparatus must be affixed to the rear of the baler to make sure that the bale is deposited on the ground on its non-string side (a baler generally forms the bale and then secures it with a string). Otherwise the bale strings would be damaged or cut when the stacker's loading forks are slid under the bales when they are being loaded or unloaded from the stacker.

In an alternative prior art embodiment of the stacker shown in FIG. 3, the forks are not located on the back of a truck but are instead mounted on the front of a trailer that can be towed by a tractor. This embodiment is easier to use than the truck (since bales can be loaded by driving forwards rather than backwards), but it has only one-half the payload capacity, and is limited to slow transporting speeds.

SUMMARY OF THE PRESENT INVENTION

Present invention comprises a novel self propelled "big bale" stacker and retriever capable of stacking 4 by 4 by 8 foot, 3 by 4 by 8 foot, or pairs of 2 by 3 by 8 foot bales in 8 by 8 foot stable, tied units. The stacker of the present invention utilizes a novel "jaw"-like arm that clamps onto a bale lying in a field. The arm swings up vertically and deposits the bale on a rotatable horizontal platform. The rotatable platform rotates 180 degrees to make room for a second bale next to the first. After two bales have been loaded onto the rotating platform, the platform tilts up 90 degrees to deposit the bales on the stacker's bed. By rotating the platform 90 degrees before depositing the bales on the bed, the orientation of the bales in successive tiers can be alternated so as to produce stable, "tied", 8 by 8 foot stacks.

DETAILED DESCRIPTION OF THE PRESENT INVENTION

Figure 5A:
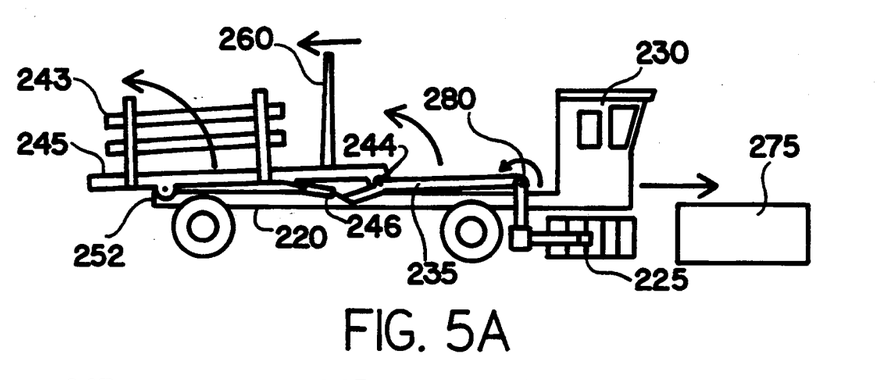
FIG. 5A is a side view of the preferred embodiment of the stacker of the present invention.
Figure 5B:
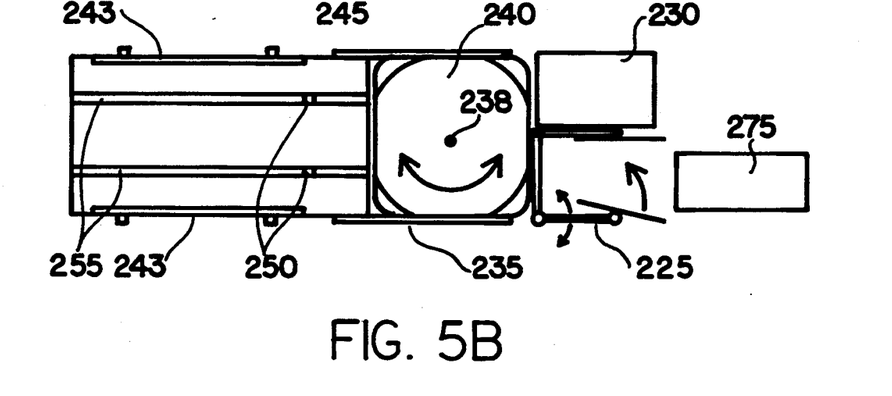
FIG. 5B is a top view of the preferred embodiment of the stacker of the present invention.

The basic components of the stacker of the present invention are shown in FIGS. 5A and 5B. The stacker is based on a truck chassis 220 with a forward mounted cab 230. The stacking system itself consists of three major components mounted to chassis 220. These three components are the pick-up arm 225, the loading platform 235, and the load bed 245.

Figure 5C:
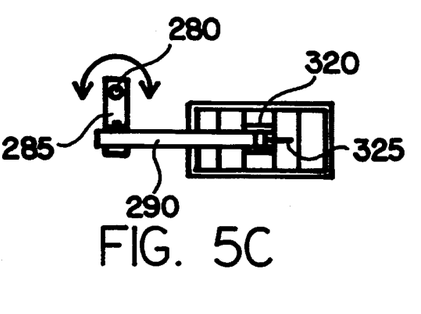
FIG. 5C is a side view of the preferred embodiment of the pick-up arm of the present invention.
Figure 5D:
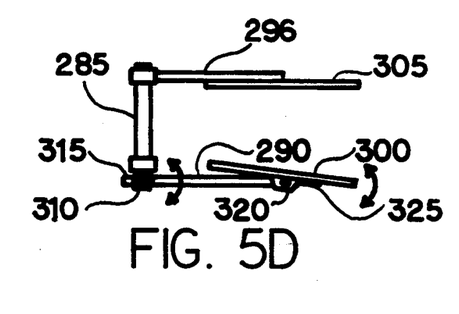
FIG. 5D is a top view of the preferred embodiment of the pick-up arm of the present invention.

As shown in FIG. 5A, pick-up arm 225 is pivotably attached to the chassis 220 at pivot point 280 such that it can pivot approximately 190 degrees around pivot point 280. As shown in greater detail in FIGS. 5C and 5D, the pick-up arm consists of a rear frame 285 which forms the basic structural backbone of the pick-up arm. Two horizontal beams 290 and 295 extend forwards from rear frame 285. Inner beam 295 is fixedly attached to rear frame 285 while outer beam 290 is attached to rear frame 285 by means of a pivot 310 such that outer beam 290 can swing outward and inward as indicated by the arrows adjacent to pivot 310 in FIG. 5D. A hydraulic ram 315 controls the position of outer beam 290. Jaws 305 and 300 are attached to the free ends of inner and outer beams 295 and 290, respectively. Jaws 305 and 300 essentially consist of reinforced metal plates having raised ridges or bumps on their facing surfaces that can be used to grab and hold hay bales, as will be described in greater detail below. Inner jaw 305 is rigidly attached to inner beam 295, while outer jaw 300 is attached to outer beam 290 by means of a pivot 320. A spring 325 biases outer jaw towards the slightly opened position shown in FIG. 5D.

As shown in FIGS. 5A and 5B, loading platform 235 is pivotably attached to load bed 245 at pivot points 244. As shown in FIG. 5B, a turntable 240 forms the greater part of the top surface of loading platform 235. Turntable 240 preferably consists of a plate of 3/16 inch thick steel plate approximately 7 by 7 feet square, with rounded corners. Turntable 240 can be rotated at least 180 degrees, and preferably 360 degrees, preferably by means of a hydraulic motor and drive chain assembly mounted below the center 238 of turntable 240. Turntable 240 is preferably supported from below by a structural steel support frame. Preferably, turntable 240 rests on plastic wear strips affixed to the top surfaces of the support frame members. Roller bearings or other friction reducing means may also be used. A pair of hydraulic rams 246 (one on each side) or other actuators allow loading platform 235 to be tilted up approximately 90 degrees, as will be described in greater detail below and as indicated by the arrow adjacent to pivot point 244 in FIG. 5A.

Load bed 245 consists of a flat bed pivotally attached to the back end of chassis 220 at pivot point 252. Two vertical supports 250 are mounted on rails 255 on top of load bed 245. As described in greater detail below, the load bed 245 complete with the attached loading platform 235 can be tilted vertically upward to unload accumulated bales of hay or retrieve previously stacked bales of hay. The load bed preferably includes guard rails 243 that prevent bales loaded onto load bed 245 from sliding sideways off load bed 245. These guard rails 243 are shown in FIGS. 5A and 5B, but are omitted from the remaining figures to more clearly show the functioning of the present invention.

Figure 6A:
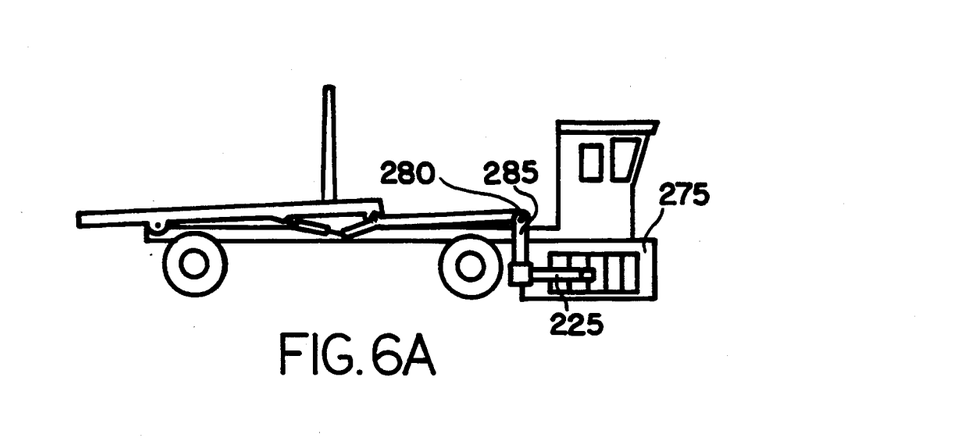
FIG. 6A is a side view showing how the pick-up arm of the present invention engages a bale.
Figure 6B:
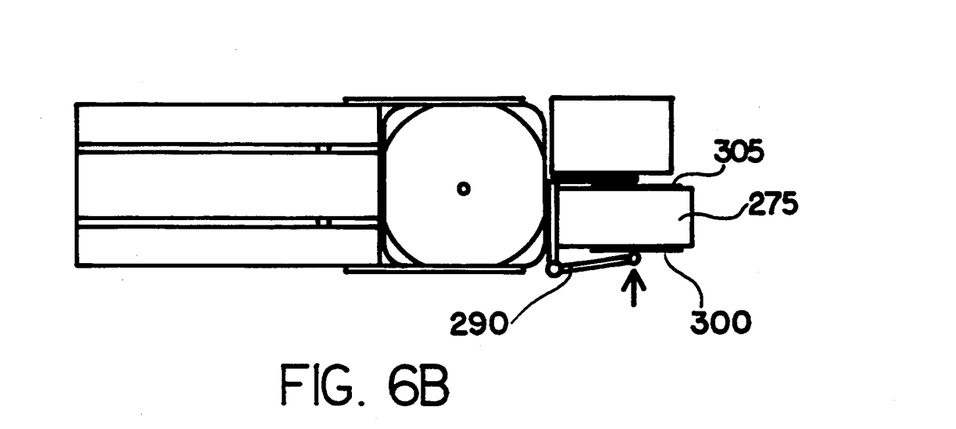
FIG. 6B is a top view showing how the pick-up arm of the present invention engages a bale.
Figure 7A:
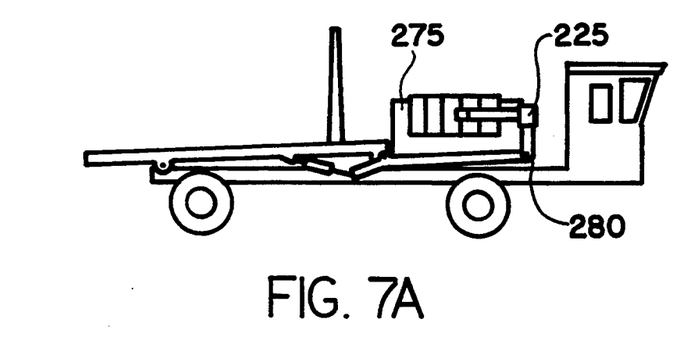
FIG. 7A is a side view showing how a bale is loaded onto the loading platform of the present invention by the pick-up arm.
Figure 7B:
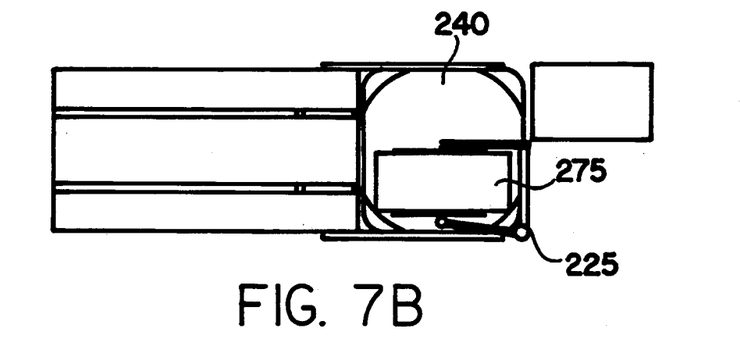
FIG. 7B is a top view showing how a bale is loaded onto the loading platform of the present invention by the pick-up arm.

The operation of the stacker of the present invention is illustrated in FIGS. 5 through 17. As shown in FIGS. 5A and 5B, the stacker is initially maneuvered into position such that the jaw opening of pick-up mechanism 225 is positioned behind a bale 275. It is assumed that 4 by 4 by 8 foot "big bales" are being loaded. Alternatively, the same method described can be used to load 3 by 4 by 8 foot bales or pairs of 2 by 3 by 8 foot bales placed side by side. The stacker is driven forward until the back of bale 275 contacts rear frame 285 of pick-up arm 225, as shown in FIG. 6A. Next, as shown in FIG. 6B, outer beam 290 of pick-up arm 225 is moved inwards such that bale 275 is clamped between jaws 300 and 305. As shown in FIGS. 7A and 7B, pick-up arm 225, complete with bale 275 is pivoted approximately 180 degrees up around pivot point 280 such that bale 275 is positioned over the right side of turntable 240 as shown in FIG. 7B. Outer beam 290 is moved outwards, and bale 275 is released from between jaws 300 and 305 and deposited on the right side (looking forwards) of turntable 240. After bale 275 has been deposited on turntable 240, pick-up arm 225 is pivoted back to its lowered position.

Figure 8:
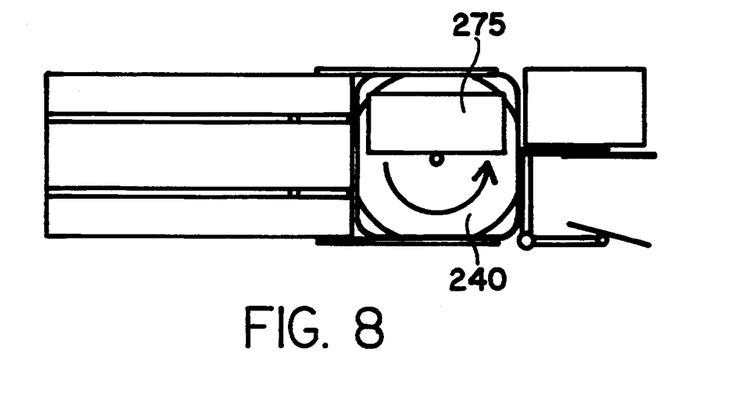
FIG. 8 is a top view showing how the rotating turntable of the present invention moves a loaded bale from one side of the loading platform to the other.
Figure 9:
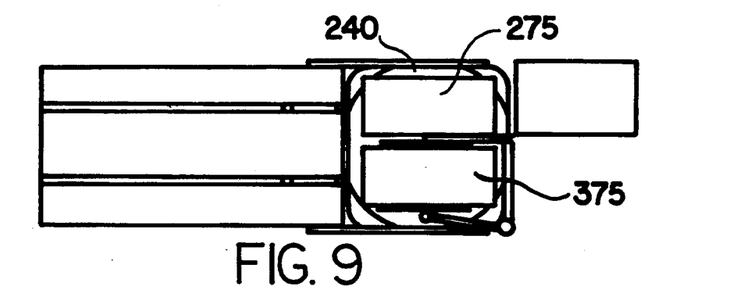
FIG. 9 is a top view showing how a second bale is loaded onto the loading platform of the present invention next to the first.

As the stacker continues to move towards the next bale, turntable 240 rotates 180 degrees, as shown in FIG. 8. Bale 275 is thereby moved over to the left side of turntable 240, freeing up the right side of turntable 240 for the next bale. Following the steps illustrated in FIGS. 5 through 7B, a second bale 375 is deposited onto turntable 240 next to bale 275, as shown in FIG. 9.

Figure 9A:
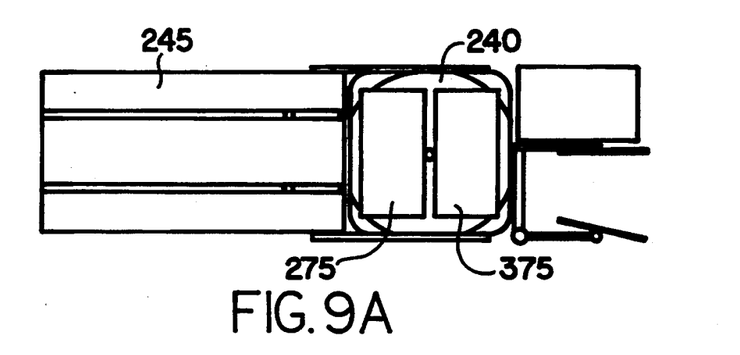
FIG. 9A is a top view showing the first two bales rotated 90 degrees prior to being deposited onto the load bed of the stacker of the present invention.
Figure 10:
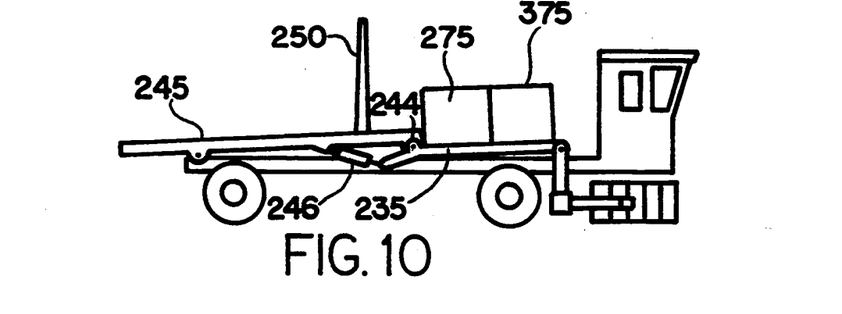
FIG. 10 is a side view showing two bales loaded onto the loading platform of the present invention.
Figure 11:
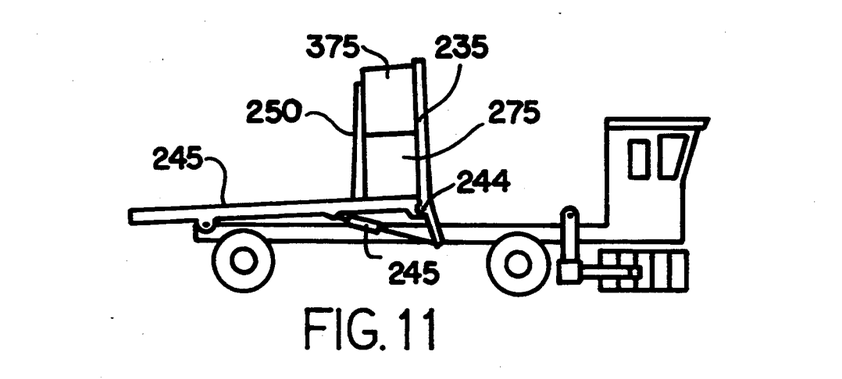
FIGS. 11 and 11A are a side view showing how the loading platform of the present invention transfers bales to the load bed of the stacker.
Figure 11A:
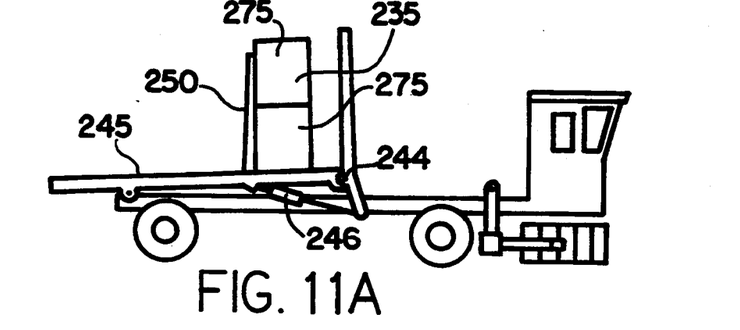

As shown in FIGS. 9A, 10 and 11, the bales that have been loaded on loading platform 235 are rotated 90 degrees (as shown in FIG. 9A) and then deposited on load bed 245 by pivoting platform 235 approximately 90 degrees upwards around pivot point 244. In the preferred embodiment shown in FIGS. 10 and 11, hydraulic rams 246 positioned on either side of loading platform 235 are used to tilt loading platform 235 into its vertical position. Thereafter, a push bar 545, shown in FIG. 18 and discussed in greater detail below, forces this first tier of bales back against supports 250, making room for the next tier to follow. As shown in FIG. 11, bales 275 and 375 are actually tilted further than the vertical such that they rest against supports 250. Preferably, supports 250 are attached to a pair of roller carriages. The carriages are attached by a cable to a hydraulic ram which keeps carriages and the attached supports 250 from rolling towards the back of the bed when the first two bales lean against them. A pressure relief valve on the ram allows the carriages and attached supports 250 to move towards the back of the bed only when the significant force of push bar 545 is applied to the front of each raised tier. Push bar 545 displaces the tiers on load bed 245 about 2 to 3 feet to facilitate loading of the next succeeding tier. This displaced position is shown in FIG. 11A. It will also be noted that the load bed 245 is tilted slightly backwards to make sure that the bales 275 and 375 continue to rest against supports 250 after loading platform 235 is lowered back to its original position.

Figure 12A:
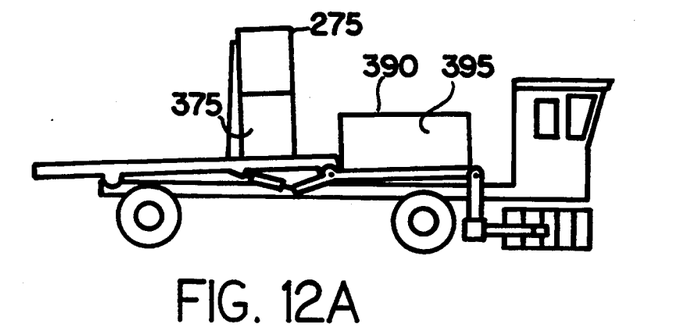
FIG. 12A is a side view showing a second tier of bales loaded onto the loading platform of the present invention.
Figure 12B:
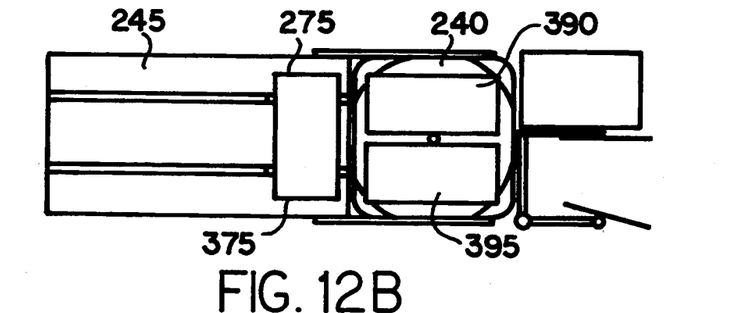
FIG. 12B is a top view showing a second tier of bales loaded onto the loading platform of the present invention.
Figure 13:
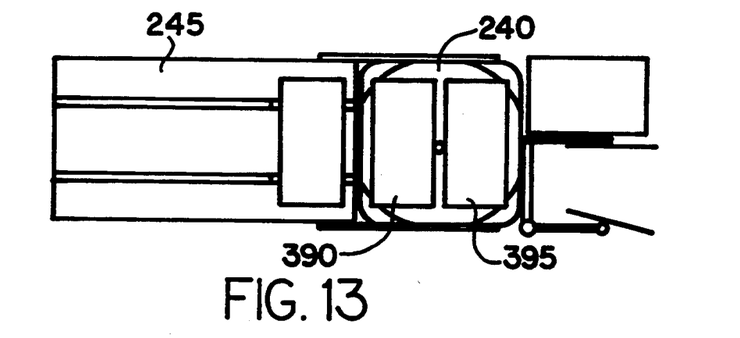
FIG. 13 is a top view showing the second tier of bales being rotated 90 degrees by the turntable of the present invention.
Figure 14:
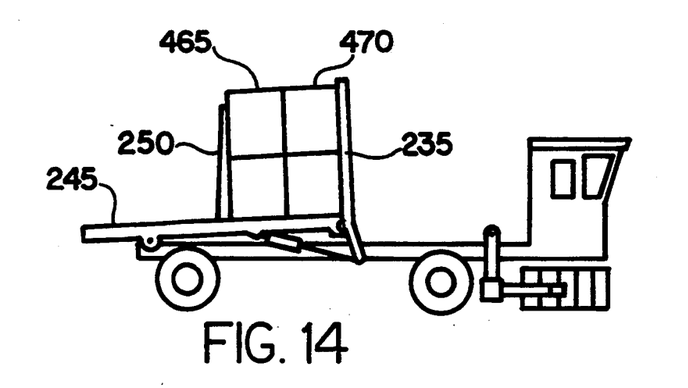
FIG. 14 is a side view showing two tiers of bales loaded onto the load bed of the stacker of the present invention.

To form the second tier of bales, as shown in FIGS. 12A and 12B, two more bales 390 and 395 are loaded onto turntable 240 following the same method used for bales 275 and 375 shown in FIGS. 5 through 10. Although it is possible to transfer bales 390 and 395 onto load bed 245 directly from the position shown in FIG. 12B, turntable 240 is preferably first rotated 90 degrees such that bales 390 and 395 are positioned as shown in FIG. 13. After turntable 240 has been rotated, loading platform 235 is again pivoted up, and the second tier, made up of bales 390 and 395, is deposited on load bed in front of the first tier consisting of bales 275 and 375. As loading platform 235 is being raised, supports 250 are pushed backwards to make room for the new bales of hay.

Figure 15:
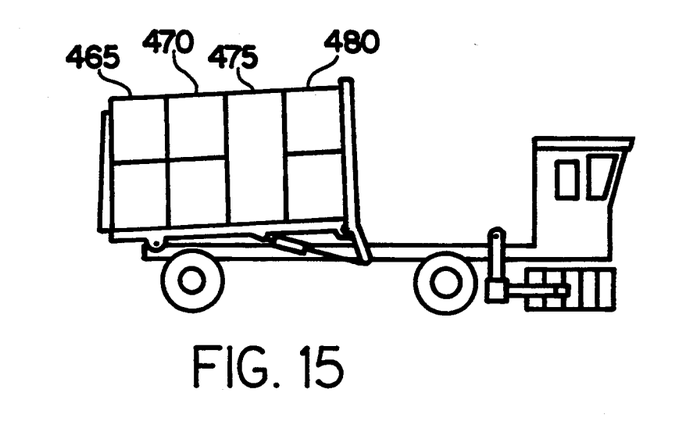
FIG. 15 is a side view showing four tiers of bales loaded onto the load bed of the stacker of the present invention.

Third and forth tiers 475 and 480, respectively are loaded onto load bed 245 in the same manner as the first two tiers 465 and 470, as shown in FIG. 15. The bales of the third tier are preferably oriented 90 degrees from the bales in each of the second and fourth tiers, as shown in FIG. 15, such that the bales in second, third and fourth tier are "tied" together.

Figure 16:
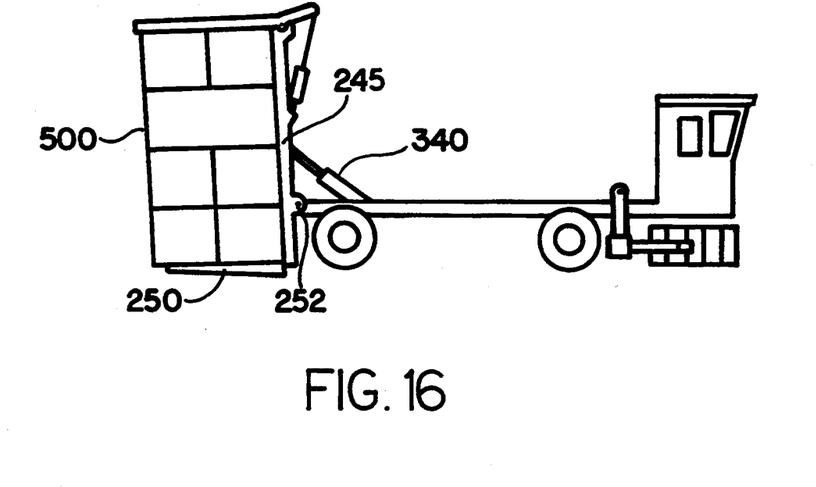
FIG. 16 is a side view showing how a stack of bales is unloaded by the stacker of the present invention.

In the preferred embodiment of the present invention, the load bed 245 can hold four tiers of 4 by 4 by 8 foot "big bales". After the load bed has been filled, the stacker is moved to the intended stacking area. The bales are unloaded by tilting load bed 245, complete with attached load platform 235, approximately 90 degrees upward around pivot point 252 as shown in FIG. 16 such that supports 250 rest on the ground. A hydraulic ram 340 is preferably used to raise load bed 245. The stacker is then driven forward, such that supports 250 are withdrawn from under four-tiered stack of bales. In one embodiment of the stacker, a push off foot is incorporated that can be used to push off against the stack of bales being unloaded to prevent bales from hanging up on forks 250 as they are withdrawn.

Figure 17:
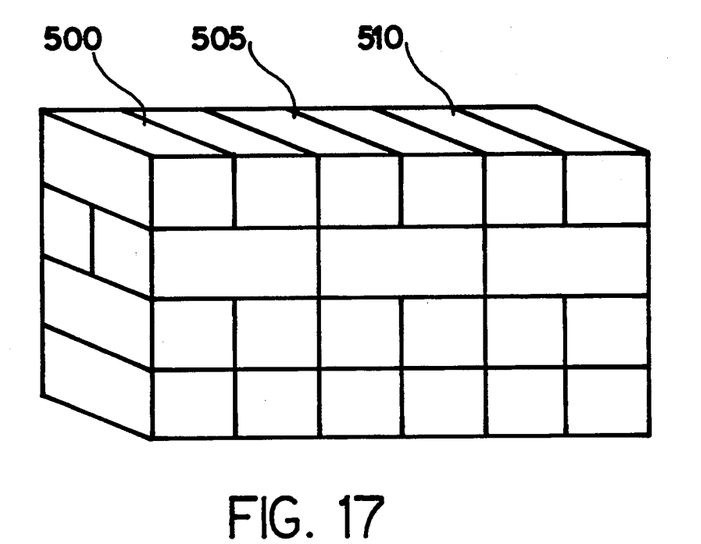
FIG. 17 is a perspective view showing a stack of 4 by 4 by 8 foot bales produced by multiple loads of the stacker of the present invention.

A stack formed by successive four-tiered stacks 500, 505 and 510, respectively, of 4 by 4 by 8 foot bales is shown in FIG. 17. Because the third tier in each stack ties together the bales in the adjacent tiers, the stacks 500, 505 and 510 formed by the stacker of the present invention are inherently more stable than the un-tied prior art stacks shown in FIGS. 2 and 4.

Figure 17A:
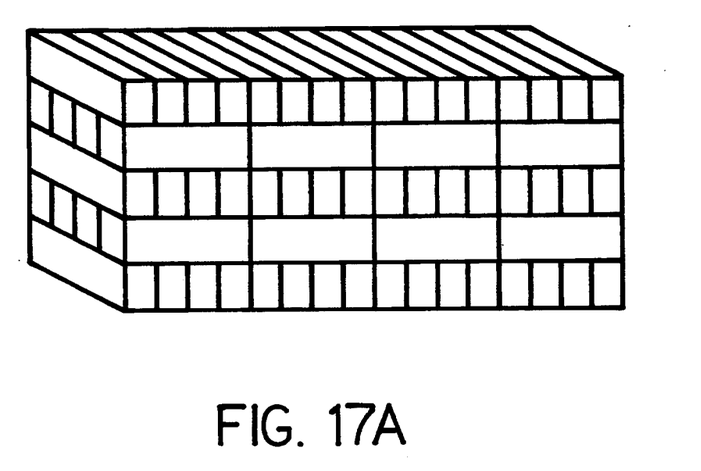
FIG. 17A is a perspective view showing a stack of 2 by 3 by 8 foot bales produced by multiple loads of the stacker of the present invention.

A stack formed by successive five tiered stacks of 2 by 3 by 8 foot bales is shown in FIG. 17A.

Figure 17B:
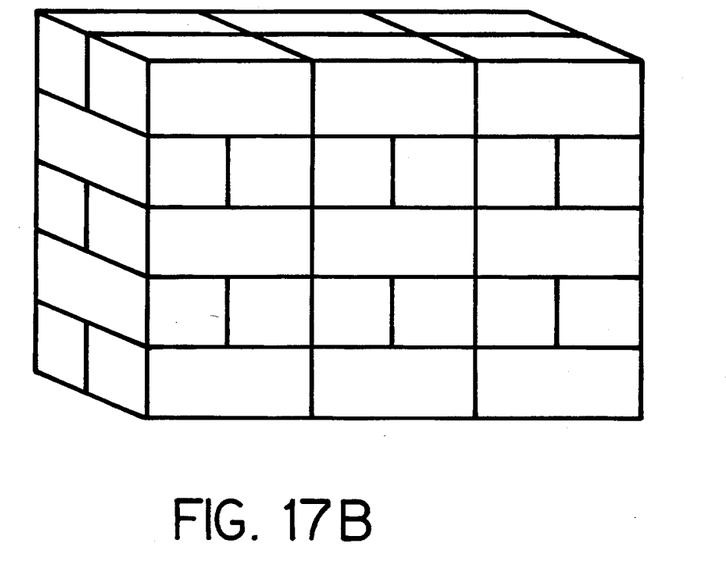
FIG. 17B is a perspective view showing a stack of 3 by 4 by 8 foot bales produced by multiple loads of the stacker of the present invention.

A stack formed by successive five-tiered stacks of 3 by 4 by 8 foot bales is shown in FIG. 17B.

The stacker of the present invention can also be used to retrieve and move stacks. The procedure is basically the reverse of the procedure used to deposit a stack of hay. In this case, the empty load bed 245 is raised into its vertical position, and the stacker is backed up to a stack of bales such that supports 250 slide under the bottom bales of the stack. As load bed 245 is lowered back into its horizontal position, supports 250 cause the stack to be tilted down onto load bed 245.

Although in most normal circumstances the force exerted by supports 250 is sufficient to load a stack onto load bed 245, if the stack has settled and is no longer solid and vertical, additional leverage on the top of the stack may be required. To provide this added leverage, the preferred embodiment of the present invention includes retrieving hooks attached to loading platform 235. These retrieving hooks are shown in FIG. 18.

Figure 18:
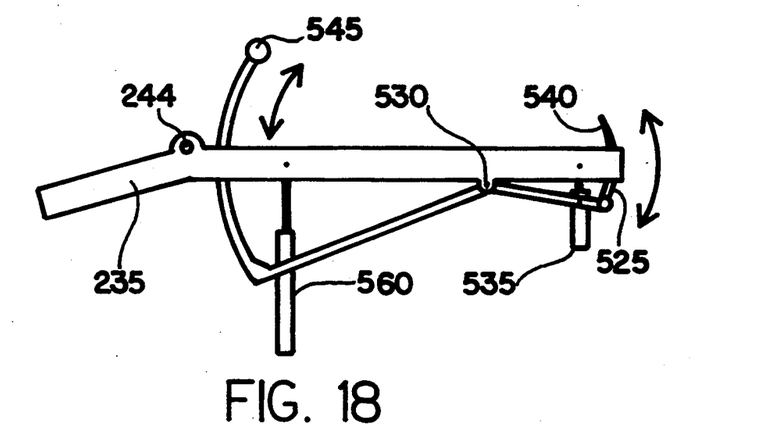
FIG. 18 is a side view showing an additional embodiment of the loading platform of the present invention.

FIG. 18 shows a side view of loading platform 235. It will be remembered that loading platform 235 is pivotably attached to load bed 245 at pivot point 244. Retrieving hooks 525 are pointed, scythe-shaped hooks whose back ends are pivotably attached to loading platform 235 at pivot points 530. The pointed tip 540 of each retrieving hook 525 can be extended through the top surface of loading platform 235 to pierce into a bale or can be withdrawn to release a bale by activation of a hydraulic ram 535 pivotably attached to both retrieving hook 525 and loading platform 235, as shown in FIG. 18.

The embodiment of the loading platform 235 shown in FIG. 18 also includes bale pusher arms 545, also pivotably attached to pivot points 530, or to other pivot points, on either side of loading platform 235. The tips of bale pusher arms 545, like the tips 540 of load hooks 525, can be extended or withdrawn through the top surface of loading platform 235 by the activation of a hydraulic ram 560. Bale pusher arms 545 are activated after a tier of bales has been loaded onto load bed 245 as shown in FIG. 11. After the bales 275 and 375 have been raised in position, bale pusher arms 545 can be extended, pushing bales 275 and 375 further towards the back of load bed 245. The resulting free space in front of bales 275 and 375 on load bed 245 makes loading of the next succeeding tier easier, since the bales of the succeeding tier will not have to push bales 275 and 375 out of the way as they are being raised onto load bed 245 by loading platform 235.

A novel bale stacker has been presented. The bale stacker of the present invention has a novel, vertically pivoting pick-up arm that facilitates the retrieving of "big bales" from a field. The present invention also features a novel loading platform that includes a turntable that simplifies the maneuvering into and out of position of bales that have been retrieved by the pick-up arm, and allows "big bales" to be arranged on the load bed in stable, tied stacks. The loading platform of the present invention also comprises novel retrieving hooks to provide increased holding power for retrieving and moving an existing stack of bales, as well as a pusher bar for providing increased room for successive tiers of bales as they are being loaded onto the stacker bed.

Although the present invention has been described with respect to a single preferred embodiment using specific components, it will be clear to those skilled in the art that the inventive concepts of the present invention can be used in other embodiments and with other components, all of which are intended to fall within the scope of the present claimed invention.

We claim:

1. A stacker for picking up bales from a field comprising:
   a chassis;
   a load bed mounted on said chassis;
   a loading platform disposed on said chassis for receiving bales and for transferring bales received to said load bed; said platform including a turntable for receiving a first bale; displacing the first bale for reception of a second bale; and orienting said bales for transfer to said load bed; and
   a pick-up arm for picking up a bale, said arm pivotably attached by first pivot means to the chassis, adjacent to said loading platform, the first pivot means being disposed such that pivoting the pick-up arm about the first pivot means allows bales that have been picked up by the pick-up arm to be deposited directly on said turntable of said loading platform.

2. The stacker of claim 1 wherein the pick-up arm comprises movable jaw means for engaging and picking up bales.

3. The stacker of claim 2 wherein the jaw means comprises means for engaging sides of bales such that the jaw means can lift and support at least one bale.

4. The stacker of claim 2 wherein the jaw means comprises frame means attached to the first pivot means and first and second horizontal beams extending from the frame means.

5. The stacker of claim 4 wherein the first horizontal beam is rigidly attached to the frame means and the second horizontal beam is movably attached to the frame means such that the second horizontal beam can be moved towards and away from the first horizontal beam.

6. The stacker of claim 5 further comprising jaw plate means attached to the first and second horizontal beams.

7. The stacker of claim 6 wherein the jaw plate means comprise gripping surface means.

8. The stacker of claim 7 wherein the gripping surface means comprises a series of raised surface portions.

9. The stacker of claim 1 wherein said loading platform is pivotably mounted to said load bed by second pivot means so as to be carried therewith for supporting bales thereon; said second pivot means operable to pivot said loading platform from a horizontal position to a vertical position for transferring bales received and oriented by said turntable to said load bed.

10. The stacker of claim 9 wherein the loading platform further comprises push arm means extendable through the top surface of the loading platform, the push arm means capable of engaging, pushing, and moving a predetermined distance along the load bed bales transferred from the loading platform to the load bed.

11. The stacker of claim 1 wherein the turntable means is rotatable through an angle of at least approximately 180 degrees.

12. The stacker of claim 1 wherein the turntable comprises most of the surface area of the loading platform.

13. The stacker of claim 1 wherein the turntable is supported by a subframe.

14. The stacker of claim 13 wherein the subframe comprises bearing means interposed between the subframe and the turntable.

15. The stacker of claim 14 wherein the bearing means comprises plastic wear strip means.

16. A bale stacker comprising:
a chassis;
bale loading means mounted to said chassis;
a load bed pivotably connected to said chassis for reciprocal horizontal to vertical movement; and
a loading platform disposed on said chassis, said platform having a turntable operable to receive a first bale directly from said loading means; to displace said bale to a position clear of said loading means for loading of a second bale upon said turntable by rotation of one hundred eighty degrees; and to selectively orient said bales for intertying said bales in placement on said load bed; and said platform pivotable from a horizontal position to a vertical position for transferring bales from said platform to said load bed.

17. The stacker as described in claim 16 wherein said bale loading means comprises a pick-up arm for aligned placement of a bale on said turntable.

* * * * *